United States Patent
Prasad et al.

(10) Patent No.: US 7,924,933 B2
(45) Date of Patent: Apr. 12, 2011

(54) ENHANCED SUCCESSIVE INTERFERENCE CANCELLATION (SIC) RECEIVER FOR MULTIPLE-INPUT MULTIPLE-OUTPUT (MIMO) SYSTEMS

(75) Inventors: Narayan Prasad, Plainsboro, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 744 days.

(21) Appl. No.: 11/857,273

(22) Filed: Sep. 18, 2007

(65) Prior Publication Data
US 2008/0069262 A1    Mar. 20, 2008

Related U.S. Application Data

(60) Provisional application No. 60/826,119, filed on Sep. 19, 2006.

(51) Int. Cl.
H04L 1/02 (2006.01)
(52) U.S. Cl. .................................................. 375/262
(58) Field of Classification Search .............. 375/262, 375/341; 714/786, 794
See application file for complete search history.

(56) References Cited

U.S. PATENT DOCUMENTS 7,266,168 B2 * 9/2007 Kwak et al. ................. 375/347
7,463,703 B2 * 12/2008 McElwain ................... 375/341
7,567,635 B2 * 7/2009 Scheim et al. ............... 375/341
7,639,760 B2 * 12/2009 Kim ............................. 375/341
7,724,832 B2 * 5/2010 Hosur et al. ................. 375/260

OTHER PUBLICATIONS

Kim, S.W. et al., "Log-Likelihood Ratio Based Successive Interference Cancellation in CMDA Systems", Vehicular Technology Conference, 2003, VTC 2003-Spring, the 57th IEEE Semiannual, vol. 4, Apr. 22-25, 2003, pp. 2390-2393.
Ren, X et al., "A New Successive Interference Cancellation for Asynchronour CDMA", Global Telecommunications Conference, 2003, GLOBECOM'03. IEEE vol. 1, Dec. 1-5, 2003, pp. 252-256.
Kim, S.W. et al., "Successive Interference Cancellation in CDMA Systems: Log-likelihood Ratio Approach", Military Communications Conference, 2005, MILCOM 05 IEEE, vol. 2 Oct. 17-20, 2005, pp. 871-875.

* cited by examiner

*Primary Examiner* — Khanh C Tran
(74) *Attorney, Agent, or Firm* — Joseph Kolodka

(57) ABSTRACT

A method includes the steps of: i) listing out all possibilities for first symbol of a two stream signal; ii) determining a second symbol of the two stream signal for each said first symbol listed out, iii) evaluating a metric for each said first symbol and second symbol pair, iv) determining the exact maximum log likelihood ratio for all bits associated with said first symbol using said metrics, v) decoding a codeword-1 using the maximum log likelihood ratios, vi) re-encoding said codeword-1, vii) modulating said re-encoded codeword-1, viii) subtracting said modulated re-encoded codeword-1 from said two stream signal, ix) determining metrics for all possibilities for second symbol in the signal obtained in viii, x) determining the maximum log likelihood ratios for all bits associated with second symbol, and xi) decoding said codeword-2 using the maximum log likelihood ratios for all bits associated with said second symbol.

6 Claims, 4 Drawing Sheets

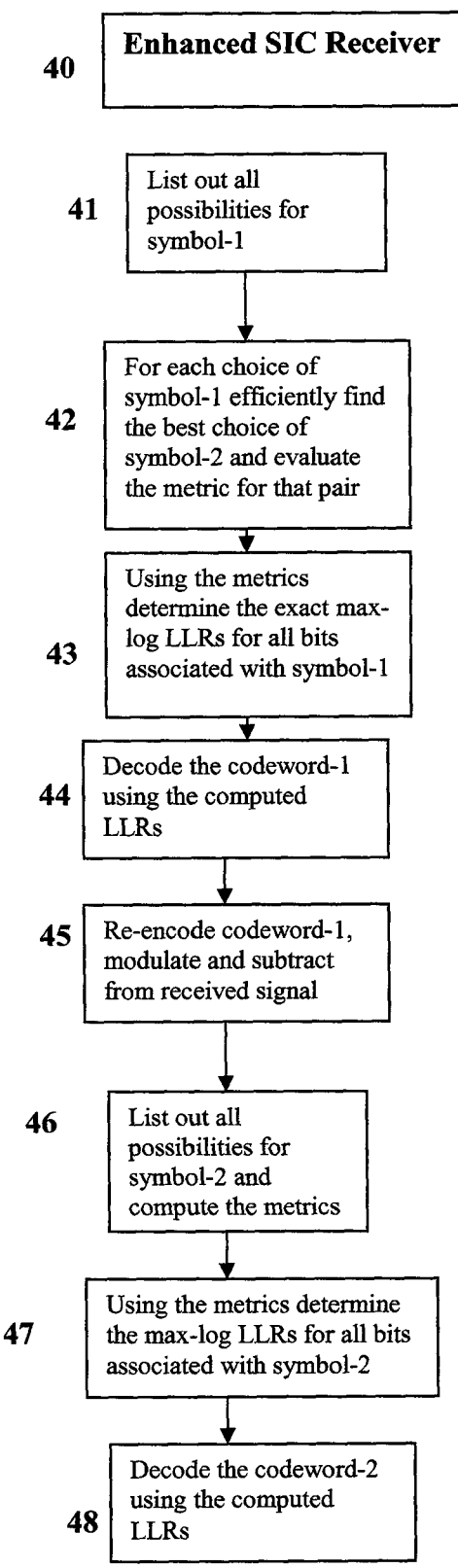
FIG. 4 (Enhanced SIC Receiver)

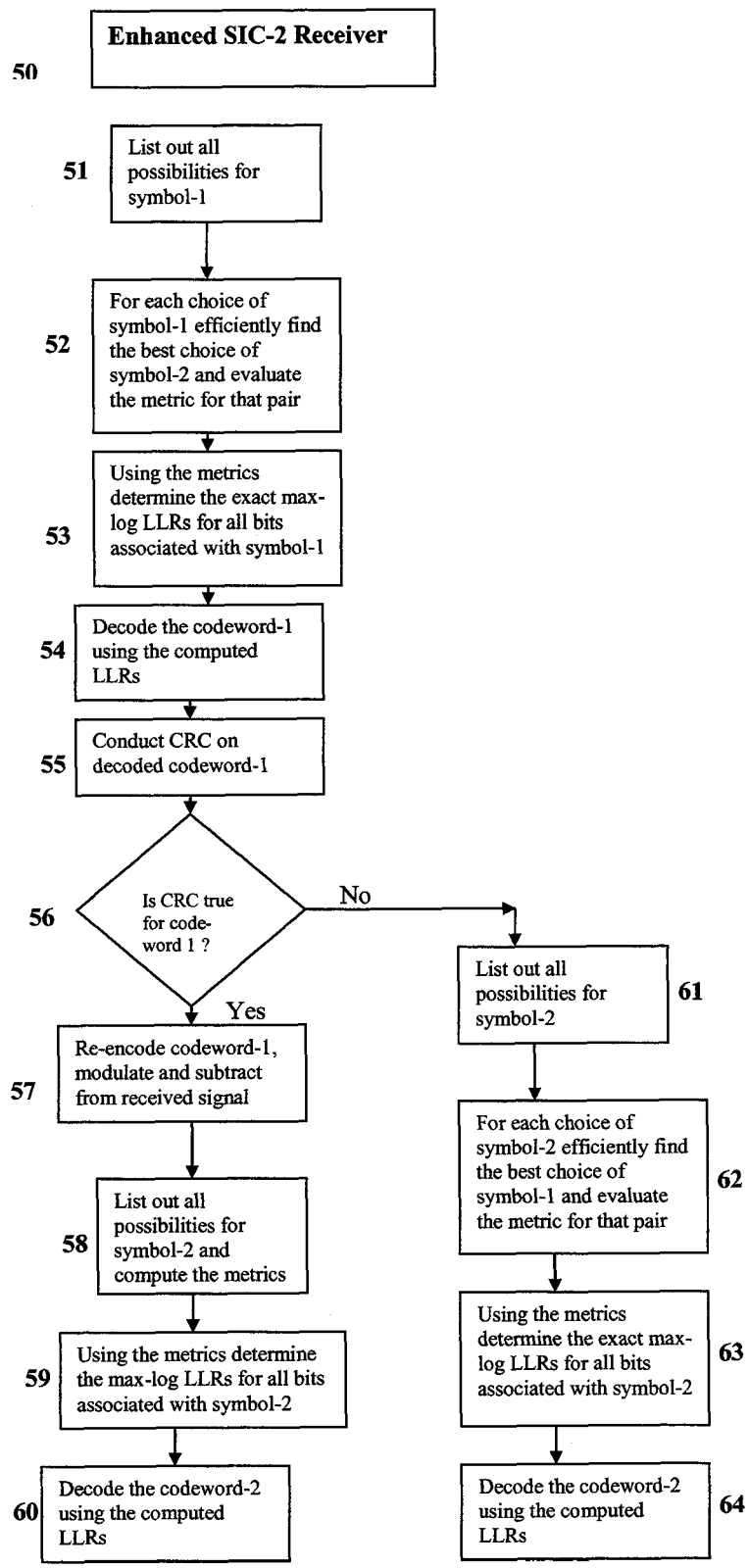
FIG. 5 (Enhanced SIC-2 Receiver)

ize_fields_and_tables> # ENHANCED SUCCESSIVE INTERFERENCE CANCELLATION (SIC) RECEIVER FOR MULTIPLE-INPUT MULTIPLE-OUTPUT (MIMO) SYSTEMS This application claims the benefit of U.S. Provisional Application No. 60/826,119, entitled "Novel two Stream Receivers For MIMO systems and their Extensions", filed on Sep. 19, 2006, the contents of which is incorporated by reference herein.

BACKGROUND OF THE INVENTION

The present invention relates generally to mobile communications, and, more particularly, to two-stream receivers for multiple-input multiple-output MIMO systems and their extensions.

In order to meet the ambitious spectral efficiency targets set for Evolved-UMTS Terrestrial Radio Access (EUTRA), low-latency and low complexity receivers are necessary. Such receivers are particularly needed at the user equipment (UE) where the complexity constraints are much more stringent. The most important scenario in the multiple antenna downlink system involves UEs with two antennas, where the basestation or the Node-B transmits two encoded streams to a scheduled UE.

A known brute force maximum likelihood ML reception method 10 for two streams, depicted in FIG. 1, involves listing all possible pairs for symbols 1 and 2 11, evaluating the metric for each pair 12, using the metrics to determine the exact max-log LLRs (maximum log likelihood ratios) for all the bits 13 and decoding the codeword(s) using the computing LLRs 14. Although the brute force ML method provides optimal demodulation it is highly complex.

The main competing demodulators to the invention are the Deterministic Sequential Monte-Carlo (D-SMC) two stream reception based receiver (another promising low-complexity receiver), shown in FIG. 2, and the successive interference cancellation SIC receiver, shown in FIG. 3.

Complexity reduction is achieved with the D-SMC method by computing the soft output for each coded bit over only a reduced set of hypotheses. The price paid for this complexity reduction is that the D-SMC suffers from a problem, usually referred to as the "missing candidate problem", in that the hypotheses (or candidates) necessary for computing the soft outputs for some of the bits may not be present in the reduced set. This missing candidate problem can cause significant degradation in the performance particularly if the reduced set is relatively small compared to the set of all hypotheses. Heuristic techniques to alleviate this problem in the D-SMC have also been proposed but such techniques require a lot of system or scenario specific fine tuning and may not work well under across all conditions.

Referring again to FIG. 2, the D-SMC method 20 involves listing out a subset of possible pairs of symbols 1 and 2 for the two streams received 21, evaluating the metric for each pair 22, using the metrics to determine the approximate max-log LLRs for all bits 23 and decoding the codeword(s) using the computed LLRs 24. Although the D-SMC reception method has tunable complexity, it also has sub-optimal demodulation due to "missing" candidate problem.

In contrast to the D-SMC reception method, the SIC receiver is a sequential receiver where one stream is first decoded and subtracted from the received signal before decoding the second stream. The soft output for the first stream is obtained after assuming the second stream to be a Gaussian interferer, which can lead to performance degradation.

Referring again to the FIG. 3, the successive interference cancellation reception method 30 involves suppressing the contribution of symbol-2 via MMSE filtering 31, evaluating the metric for all possibilities of symbol-1 32, using the metrics to determine the max-log LLRs for all bits associated with symbol-1 33, decoding the codeword-1 using the computed LLRs 34, re-encoding the codeword which is then modulated and subtracted from the received signal 35, listing out all possibilities for symbol-2 and computing the metrics 36, using the metrics to determine the max-log LLRs for all bits associated with symbol-2 37, and then decoding codeword-2 38.

Accordingly, there is a need for two-stream receivers that are eminently suitable for receivers with low-latency and low complexity necessary to meet the ambitious spectral efficiency targets set for Evolved-UMTS Terrestrial Radio Access (EUTRA).

SUMMARY OF THE INVENTION

In accordance with the invention, a method includes the steps of: i) listing out all possibilities for first symbol of a two stream signal; ii) determining a second symbol of the two stream signal for each said first symbol listed out, iii) evaluating a metric for each said first symbol and second symbol pair, iv) determining the exact maximum log likelihood ratio for all bits associated with said first symbol using said metrics, v) decoding the first codeword (codeword-1) using the computed log likelihood ratios, vi) re-encoding said codeword-1, vii) modulating said re-encoded codeword-1 to re-construct the first stream, viii) subtracting said modulated and re-encoded codeword-1 from said two stream received signal, ix) determining metrics for all possibilities for second symbol in the signal obtained above, x) determining the maximum log likelihood ratios for all bits associated with second symbol, and xi) decoding said codeword-2 using the computed log likelihood ratios LLRs for all bits associated with said second symbol.

In another aspect of the invention, a method includes the steps of: i) listing out all possibilities for first symbol of a two stream signal; ii) determining a second symbol of the two stream signal for each said first symbol listed out, iii) evaluating a metric for each said first symbol and second symbol pair, iv) determining the exact maximum log likelihood ratio for all bits associated with said first symbol using said metrics, v) decoding the first codeword (codeword-1) using the computed log likelihood ratios, vi) conducting a cyclic redundancy check (CRC) on the said decoded codeword-1, vii) In case the CRC is true, re-encoding said codeword-1, vii) modulating said re-encoded codeword-1, viii) subtracting said modulated and re-encoded codeword-1 from said two stream received signal, ix) determining metrics for all possibilities for second symbol in the signal obtained above, x) determining the maximum log likelihood ratios for all bits associated with second symbol, and xi) decoding said codeword-2 using the computed log likelihood ratios LLRs for all bits associated with said second symbol, xii) In case the CRC in step (vi) is false, listing out all possibilities for second symbol in the received two stream signal; xiii) determining a first symbol of the two stream signal for each said second symbol listed out, xiv) evaluating a metric for each said first symbol and second symbol pair, xv) determining the exact maximum log likelihood ratio for all bits associated with said second symbol using said metrics, xvi) decoding the second codeword (codeword-2) using the computed log likelihood ratios.

In a preferred extension of steps i)-xi) (in para 11) to multiple (K>2) signal streams, with structure of a conventional successive interference cancellation SIC receiver and obtaining the max-log outputs for the $i^{th}$ stream by subtracting the previously decoded streams 1 to i−1 and either nulling out streams i+2 to K or suppressing them after assuming them to be Gaussian interferers using MMSE filtering. Assuming perfect feedback from the subtracted streams and whitening the suppressed interference plus noise, the $i^{th}$ stream is decoded and re-constructed in accordance with steps i)-vii) in para 11.

In another preferred extension to multiple (K>2) signal streams, max-log outputs for the $i^{th}$ stream are obtained by subtracting only those streams from 1 to i−1 for which the decoded codewords pass the CRC and suppressing streams i+2 to K as well as the remaining ones from 1 to i−1, after assuming them to be Gaussian interferers using MMSE filtering. Assuming perfect feedback from the subtracted streams and whitening the suppressed interference plus noise, the the $i^{th}$ stream is decoded and subject to a CRC in accordance with steps i)-vi) in para 12.

BRIEF DESCRIPTION OF DRAWINGS

These and other advantages of the invention will be apparent to those of ordinary skill in the art by reference to the following detailed description and the accompanying drawings.

FIG. 4 is a flow diagram of an enhanced successive interference cancellation for two stream wireless reception, in accordance with the invention.

FIG. 5 is a flow diagram of the second version of the enhanced successive interference cancellation for two stream wireless reception, in accordance with the invention.

DETAILED DESCRIPTION

Figures 1, 2:
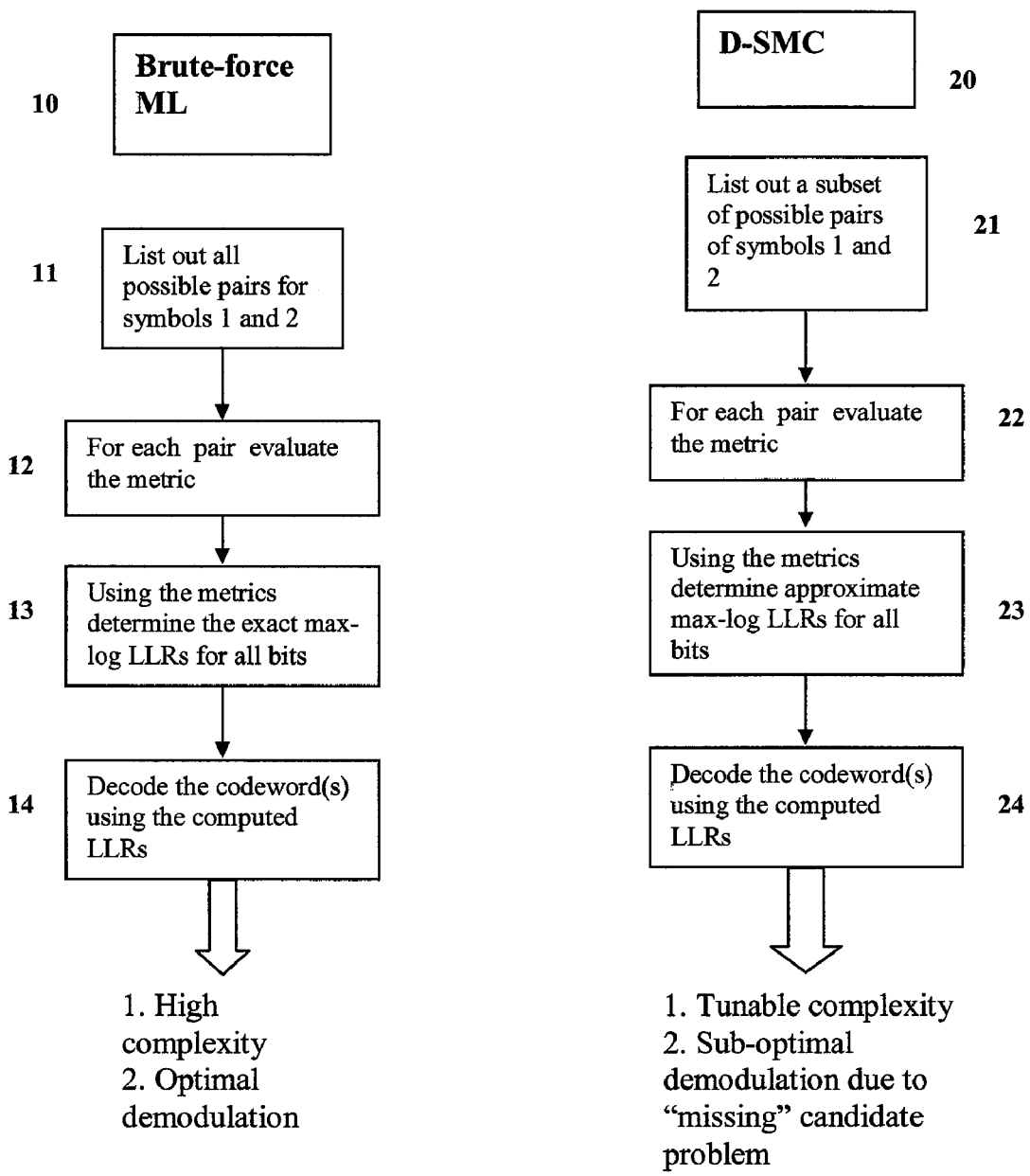
FIG. 1 is a flow diagram of a brute force maximum likelihood two stream wireless reception, in accordance with the prior art.
FIG. 2 is a flow diagram of Deterministic Sequential Monte-Carlo (D-SMC) two stream reception, in accordance with the prior art.
Figure 3:
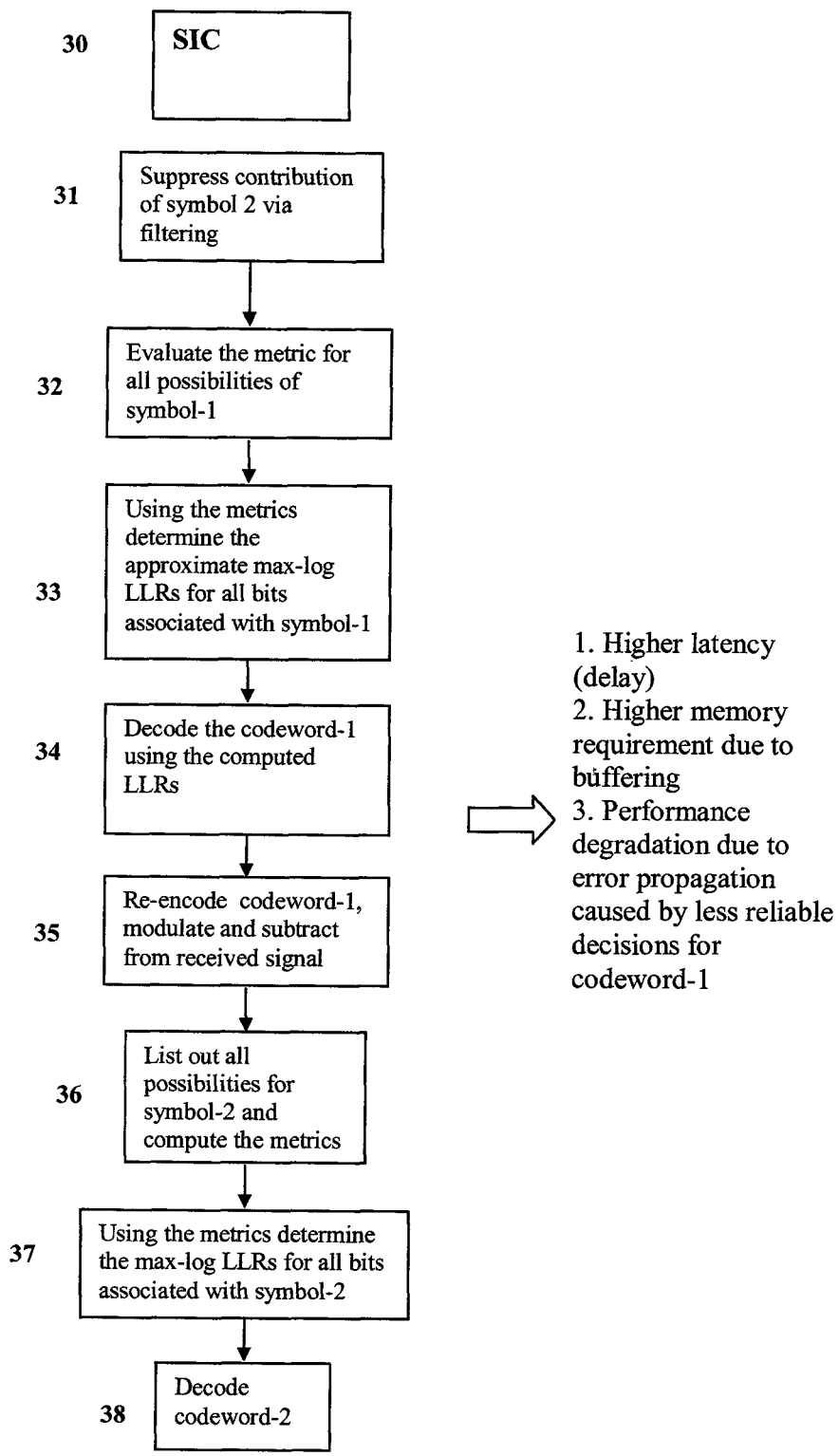
FIG. 3 is a flow diagram of successive interference cancellation SIC two stream wireless reception, in accordance with the prior art.

In the invention, there is presented an enhanced two-stream SIC receiver where the exact max-log outputs are obtained for all the bits in the stream first decoded (with O(M) complexity) as opposed to the conventional case involving Gaussian approximation. The inventive enhanced two-stream receiver is flow charted in FIG. 4.

In another aspect of the invention, there is presented the second version of the enhanced two-stream SIC receiver which aims to avoid error propagation by subtracting only correctly decoded codewords. The inventive second version of the enhanced two-stream receiver is flow charted in FIG. 5.

Also, described are methods to extend the inventive two-stream receivers to multiple streams.

Referring again to FIG. 4, the inventive enhanced SIC receiver 40 method for two stream reception includes listing out all possibilities for symbol-1 41, for each choice of symbol-1 efficiently finding the best choice of symbol-2 and evaluating the metric for that pair 42, using the metrics to determine the exact max-log LLRs for all bits associated with symbol-1 43, decoding the codeword-1 using the computed LLRs 44, re-encoding the codeword-1 and then modulating and subtracting it from the received signal 45, listing out all possibilities for symbol-1 and computing the metrics 46, using the metrics to determine the max-log LLRs for all bits associated with symbol-2 47, and decoding the codeword-2 using the computed LLRs 48. This inventive enhanced SIC receiver method has a higher latency (delay), a higher memory requirement due to buffering, and much less error propagation since reliable decisions are obtained for codeword-1.

We now describe the inventive two stream enhanced SIC receiver. Consider the model $$y = H \begin{bmatrix} x_1 \\ x_2 \end{bmatrix} + v \qquad (1)$$

where, H is the N×2 channel matrix (N≧2), v is the additive noise having i.i.d. Gaussian elements. $x_1$ and $x_2$ are symbols from a common M-QAM constellation. Let H=[$h_1$, $h_2$] and H=||$h_2$||$^2$ UL be the modified QR decomposition of H with U being a scaled semi-unitary matrix and L being lower triangular with positive diagonal elements. In particular, we obtain U=[$u_1$, $u_2$] with $$u_1 = \frac{h_1 \|h_2\|^2 - h_2 <h_1, h_2>}{\|h_2\|^2 \sqrt{\|h_1\|^2 \|h_2\|^2 - |<h_1, h_2>|^2}}$$

$$u_2 = \frac{h_2}{\|h_2\|^2}$$

where $<h_1, h_2>=h_2^* h_1$ is the (complex) inner product of the two vectors and $$L = \begin{bmatrix} L_{11} & 0 \\ L_{21} & 1 \end{bmatrix}$$

$$L_{11} = \frac{\sqrt{\|h_1\|^2 \|h_2\|^2 - |<h_1, h_2>|^2}}{\|h_2\|^2}$$

$$L_{21} = \frac{<h_1, h_2>}{\|h_2\|^2}$$

Then we obtain $$\begin{bmatrix} z_1 \\ z_2 \end{bmatrix} = U^* y = \begin{bmatrix} L_{11} & 0 \\ L_{21} & 1 \end{bmatrix} \begin{bmatrix} x_1 \\ x_2 \end{bmatrix} + \tilde{v} \qquad (2)$$

and note that transformed noise vector $\tilde{v}$ remains white. Let $\{x_{i,j}\}_{j=1}^M$ denote the M-QAM symbols and let $x_i^R$, $x_i^I$ denote the real and imaginary parts of $x_i$, $1 \leq i \leq 2$, respectively. For each $x_{1,j}$ we define the metric $$Q(x_{1,j}) = |z_1 - L_{11} x_{1,j}|^2 + \min_{x_2} |z_2 - L_{21} x_{1,j} - x_2|^2 \qquad (2b)$$

Defining $q_{i,j} = z_2 - L_{21} x_{1,j}$ we can express $Q(x_{1,j})$ as $$Q(x_{1,j}) = |z_1 - L_{11} x_{1,j}|^2 + \min_{x_2^R} |q_{1,j}^R - x_2^R|^2 + \min_{x_2^I} |q_{1,j}^I - x_2^I|^2$$

Since both $x_2^R$, $x_2^I$ belong to a common $\sqrt{M}$-PAM constellation, the two minimizations for computing $Q(x_{1,j})$ can be done in parallel using simple slicing (rounding) operations with O(1) complexity each. All $\{Q(x_{1,j})\}_{j=1}^M$ are efficiently determined using the described method. Also, using the fact that $L_{11}$ is positive along with the symmetry of the M-QAM constellation, we have that $\{L_{11}x_{1,j}^R\}_{j=1}^{\sqrt{M}}=\{L_{11}x_{1,j}^I\}_{j=1}^{\sqrt{M}}$. Then since $$|z_1-L_{11}x_{1,j}|^2=|z_1^R-L_{11}x_{1,j}^R|^2+|z_2^I-L_{11}x_{1,j}^I|^2$$

we have that only $3\sqrt{M}$(real) multiplications are required to evaluate all $\{|z_1-L_{11}x_{1,j}|^2\}_{j=1}^M$ instead of 2M complex ones. The M metrics $\{Q(x_{1,j})\}_{j=1}^M$ can also be efficiently determined even for other regular constellations. To illustrate, we consider the example of PSK constellation. Let $x_1$ and $x_2$ be symbols from a common unit average energy M-PSK constellation: $\exp(j\theta_M), \theta_M \in \{0, 2\pi/M, \ldots, 2\pi(M-1)/M\}$. Then to efficiently determine $\{Q(x_{1,j})\}$ we re-write equation (2b) as $$Q(x_{1,j})=|z_1-L_{11}x_{1,j}|^2+\min_{x_2}|q_{1,j}-x_2|^2 \quad (3b)$$

and obtain $q_{1,j}$ in its polar form as $q_{1,j}=r_{1,j}\exp(j\alpha_{1,j})$ such that $r_{1,j}>0, \alpha_{1,j}\in[0,2\pi)$. Let $\beta_{1,j}=M\alpha_{1,j}/2\pi)-\frac{1}{2}$. Then the minimizing $x_2$ in (3b) can now be determined (with O(1) complexity) in closed form and is given by $\exp(2\pi(\lfloor\beta_{1,j}\rfloor+1)/M)$, where $\lfloor\ \rfloor$ denotes the floor operator. In a similar manner the minimizing $x_2$ in (3b) can be determined efficiently for other regular constellations by exploiting their decision regions.

Now each size-M constellation corresponds to log(M) bits so we need to determine the max-log soft output for log(M) bits associated with symbol-1. The M metrics $\{Q(x_{1,j})\}_{j=1}^M$, which we efficiently determined are exactly those needed to determine the max-log output for each bit. To see this, suppose bits numbered 1 to log(M) correspond to symbol $x_1$. Then letting $\lambda_i$ denote the max-log output of the $i^{th}$ bit $b_i$ and assuming equal a-priori probabilities, we have that $$\lambda_i=||h_2||^2(\min_{j:b_i=0}Q(x_{1,j})-\min_{j:b_i=1}Q(x_{1,j})) \ldots$$
$$1 \leq i \leq \log(M)$$

Thus we have shown that the complexity of our method to determine the max-log output for each of the log(M) bits is O(M) instead of the O(M²) complexity of the usual method.

The max-log outputs are fed to the outer code or FEC decoder for codeword-1 and the decisions $\{\hat{x}_1\}$ (which correspond to the re-encoded and modulated codeword-1) are obtained.

For each symbol interval, we compute $\hat{z}_2=z_2-L_{21}\hat{x}_1$ and the soft-outputs for the second stream are obtained under the assumption of perfect feedback as $$Q(x_{2,j})=|\hat{z}_2-x_{2,j}|^2, 1\leq j \leq M$$

$$\lambda_i=||h_2||^2(\min_{j:b_i=0}Q(x_{2,j})-\min_{j:b_i=1}Q(x_{2,j})) \quad . \quad . \quad .$$
$$\log(M)+1 \leq i \leq 2\log(M)$$

The max-log outputs are fed to the outer code or FEC decoder for codeword-2.

Referring again to FIG. 5, the second enhanced SIC receiver (E-SIC-2) 50 method for two stream reception includes listing out all possibilities for symbol-1 51, for each choice of symbol-1 efficiently finding the best choice of symbol-2 and evaluating the metric for that pair 52, using the metrics to determine the exact max-log LLRs for all bits associated with symbol-1 53, decoding the codeword-1 using the computed LLRs 54, conducting a cyclic redundancy check (CRC) on the decoded codeword-1 55, checking if CRC is true for codeword-1 56, in case the step in 56 is true re-encoding the codeword-1 and then modulating and subtracting it from the received signal 57, listing out all possibilities for symbol-2 and computing the metrics 58, using the metrics to determine the max-log LLRs for all bits associated with symbol-2 59, and decoding the codeword-2 using the computed LLRs 60, in case the step in 56 is false listing out all possibilities for symbol-2 in the two stream signal 61, for each choice of symbol-2 efficiently finding the best choice of symbol-1 and evaluating the metric for that pair 62, using the metrics to determine the exact max-log LLRs for all bits associated with symbol-2 63, decoding the codeword-2 using the computed LLRs 64. This inventive second version of the enhanced SIC receiver has a higher complexity but in general better performance compared to the original E-SIC receiver.

Next, we describe the second version of our enhanced SIC receiver (E-SIC-2 receiver). Our E-SIC-2 receiver works as follows. We use the procedure previously described in the E-SIC receiver to decode codeword-1 and conduct a cyclic redundancy check (CRC) on the decoded codeword. In case CRC is true for codeword-1, for each symbol interval, we compute $\hat{z}_2=z_2-L_{21}\hat{x}_1$ and the soft-outputs for the second stream (codeword) are obtained as $$Q(x_{2,j})=|\hat{z}_2-x_{2,j}|^2, 1\leq j \leq M$$

$$\lambda_i=||h_2||^2(\min_{j:b_i=0}Q(x_{2,j})-\min_{j:b_i=1}Q(x_{2,j})) \ldots \log$$
$$(M)+1 \leq i \leq 2\log(M)$$

The obtained LLRs are used to decode the second codeword.

In case CRC is false for codeword-1, we obtain another modified QR decomposition $H=||h_1||^2$ VR, with V being a scaled semi-unitary matrix and R being upper triangular with positive diagonal elements. In particular, we obtain $V=[v_1, v_2]$ with $$v_2 = \frac{h_2||h_1||^2 - h_1 < h_2, h_1 >}{||h_1||^2 \sqrt{||h_1||^2||h_2||^2 - |<h_1,h_2>|^2}}$$

$$v_1 = \frac{h_1}{||h_1||^2}$$

where $<h_2,h_1> = h_1^* h_2$ is the complex conjugate of $<h_1,h_2>$ and $$R = \begin{bmatrix} 1 & R_{12} \\ 0 & R_{22} \end{bmatrix}$$

$$R_{22} = \frac{\sqrt{||h_1||^2||h_2||^2 - |<h_1,h_2>|^2}}{||h_1||^2}$$

$$R_{12} = \frac{<h_2,h_1>}{||h_1||^2}$$

Using V we determine $w=V^*y$ which can be expressed as $$\begin{bmatrix} w_1 \\ w_2 \end{bmatrix} = V^*y = \begin{bmatrix} 1 & R_{12} \\ 0 & R_{22} \end{bmatrix}\begin{bmatrix} x_1 \\ x_2 \end{bmatrix} + \hat{v}$$

Next, for each $x_{2,j}$ we define the metric $$Q(x_{2,j})=|w_2-R_{22}x_{2,j}|^2+\min_{x_1}|w_1-R_{12}x_{2,j}-x_1|^2 \quad (2c)$$

Defining $q_{2,j}=w_1-R_{12}x_{2,j}$, we can express $Q(x_{2,j})$ as $$Q(x_{2,j})=|w_2-R_{22}x_{2,j}|^2+\min_{x_1^R}|q_{2,j}^R-x_1^R|^2+$$
$$\min_{x_1^I}|q_{2,j}^I-x_1^I|^2$$

Again since both $x_1^R, x_1^I$ belong to a $\sqrt{M}$-PAM constellation, the two minimizations for computing $Q(x_{2,j})$ can also be done as before in parallel using simple slicing operations. All $\{Q(x_{2,j})\}_{j=1}^M$ are efficiently determined using the described method. As described previously, the minimizing $x_1$ in (2c) can be determined efficiently for other regular constellations (such as PSK) by exploiting their decision regions. The LLRs for the second stream (codeword) are obtained as $$\lambda_i' = ||h_1||^2(\min_{j:b_j=0} Q(x_{2,j}) - \min_{j:b_j=1} Q(x_{2,j}))$$
$$\log(M)+1 \leq i \leq 2\log(M).$$

The obtained LLRs are used to decode the second codeword.

Next, we consider the extension of our enhanced SIC receiver to multiple (K>2) streams. One way is to retain the structure of the conventional SIC receiver. However to obtain the max-log outputs for the $i^{th}$ stream we subtract the previously decoded streams 1 to i−1 and either null out streams i+2 to K or suppress them after assuming them to be Gaussian interferers using MMSE filtering. Then assuming perfect feedback from the subtracted streams and whitening the suppressed interference plus noise, we obtain the LLRs for the $i^{th}$ stream using the procedure described for the stream first decoded in our two-stream enhanced SIC. The obtained LLRs are then used to decode the $i^{th}$ codeword. This procedure is employed for all streams 1 to K−1. For the $K^{th}$ stream, after subtracting streams 1 to K−1 from the received signal, we assume a single stream model and obtain the max-log outputs using the procedure described for the stream decoded second in our two-stream enhanced SIC. The obtained LLRs are then used to decode the $K^{th}$ codeword.

We consider another extension of our enhanced SIC receiver to multiple (K>2) streams. In this case we only subtract decoded streams for which the decoded codewords pass the CRC. In particular, to obtain the LLRs for the first stream we suppress streams 3 to K after them after assuming them to be Gaussian interferers using MMSE filtering. Then we whiten the suppressed interference plus noise and obtain the max-log outputs for the first stream using the procedure described for the stream first decoded in our two-stream enhanced SIC and decode the first codeword. We conduct a CRC for the decoded codeword. In case the CRC is true we reconstruct the first stream by re-encoding and modulating the first codeword and subtract the codeword from the received signal. In case CRC is false, we assume that the first stream is an un-decodable Gaussian interferer and suppress it by using the appropriate MMSE filter on the received signal. In either case we can expand the processed received vector as, the output corresponding to a K−1 input streams (streams 2 to K) model. Then to obtain the LLRs for the second stream we suppress streams 4 to K after assuming them to be Gaussian interferers, whiten the suppressed interference plus noise and obtain the max-log outputs using the procedure described for the stream first decoded in our two-stream E-SIC. The second stream is reconstructed and subtracted only if the decoded second codeword passes the CRC. The procedure is used to decode streams 3 to K−1. For the $K^{th}$ stream, after subtracting or suppressing and whitening streams 1 to K−1 from the received signal, we assume a single stream model and obtain the max-log LLRs using the procedure described for the stream decoded second in our two-stream E-SIC. The obtained LLRs are then used to decode the $K^{th}$ codeword.

In summary, we considered the two-stream MIMO decoding problem and designed two receivers. The first one is an enhanced successive interference cancellation (SIC) based receiver which significantly outperforms the conventional SIC receiver. The second receiver is another version of the enhanced successive interference cancellation (SIC) based receiver which aims to avoid error propagation by subtracting only correctly decoded codewords. Extensions of the inventive two-stream receivers to the general case with multiple streams were also obtained.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, although not explicitly shown or described herein, embody the principles of the invention and are within their spirit and scope.

What is claimed is:

1. A method comprising the steps of:
   i) listing out all possibilities for first symbol of a two stream signal;
   ii) determining a second symbol of the two stream signal for each said first symbol listed out,
   iii) evaluating a metric for each said first symbol and second symbol pair,
   iv) determining the exact maximum log likelihood ratio for all bits associated with said first symbol using said metrics,
   v) decoding a codeword-1 associated with said first symbol using the maximum log likelihood ratios,
   vi) re-encoding said codeword-1,
   vii) modulating said re-encoded codeword-1,
   viii) subtracting said modulated re-encoded codeword-1 from said two stream signal,
   ix) determining the metrics for all possibilities of second symbol in the signal obtained in step viii,
   x) determining the maximum log likelihood ratios for all bits associated with second symbol, and
   xi) decoding codeword-2 associated with said second symbol using the maximum log likelihood ratios LLRs for all bits associated with said second symbol.

2. The method of claim 1, wherein max-log (maximum log) outputs are fed to an outer code or FEC decoder and decisions $\{\hat{x}_1\}$ are obtained.

3. A method comprising of the steps i to v of claim 1 and:
   vi) Conducting a CRC on decoded codeword-1,
   vii) In the case CRC is true for decoded codeword-1, performing steps vi to xi of claim 1
   viii) In case CRC is false:
   viii-a) listing out all possibilities for second symbol of a two stream signal;
   viii-b) determining a first symbol of the two stream signal for each said second symbol listed out,
   viii-c) evaluating a metric for each said first symbol and second symbol pair,
   viii-d) determining the exact maximum log likelihood ratio for all bits associated with said second symbol using said metrics,
   viii-e) decoding a codeword-2 associated with said second symbol using the maximum log likelihood ratios.

4. The method of claim 3, wherein max-log (maximum log) outputs are fed to an outer code or FEC decoder to decode codeword-2.

5. The method of claim 3, further being extended to multiple (K>2) signal streams wherein obtaining the LLRs for the $i^{th}$ stream, with only those streams from 1 to i−1 for which the decoded codewords pass the CRC are subtracted and streams i+2 to K as well as the remaining ones from 1 to i−1, are suppressed using MMSE filtering and assuming perfect cancellation of the subtracted streams and whitening the suppressed interference plus noise, the $i^{th}$ stream being decoded and subject to a CRC in accordance with steps i)-vi) of claim 3.

6. The method of claim 1, wherein said steps i) to xi) are extended to multiple (K>2) signal streams, retaining the structure of a conventional successive interference cancellation SIC receiver. In particular, to obtain the log likelihood ratios (LLRs) for the $i^{th}$ stream, the previously decoded streams 1 to i−1 are subtracted and streams i+2 to K are suppressed via MMSE filtering. Assuming perfect cancellation of the subtracted streams and whitening the suppressed interference plus noise, the $i^{th}$ stream is decoded and reconstructed in accordance with steps i)-vii) of claim 1.

* * * * *